(12) United States Patent
Rickenbach et al.

(10) Patent No.: US 10,336,283 B2
(45) Date of Patent: Jul. 2, 2019

(54) OBLIQUE IMPACT AIRBAG MITTS AND RELATED SYSTEMS AND METHODS

(71) Applicant: Autoliv ASP, Inc., Ogden, UT (US)

(72) Inventors: Roger Dean Rickenbach, Pleasant View, UT (US); Don Larry Parker, Syracuse, UT (US); Terry Alan Wheelwright, Morgan, UT (US); Derek John Wiscombe, Morgan, UT (US); Christine Elizabeth Devey, Wellsville, UT (US); Andrew Lawrence Holliday, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 130 days.

(21) Appl. No.: 15/590,734

(22) Filed: May 9, 2017

(65) Prior Publication Data

US 2018/0326938 A1 Nov. 15, 2018

(51) Int. Cl.
| | |
|---|---|
| *B60R 21/16* | (2006.01) |
| *B60R 21/233* | (2006.01) |
| *B60R 21/2338* | (2011.01) |
| *B60R 21/231* | (2011.01) |
| *B60R 21/00* | (2006.01) |

(52) U.S. Cl.
CPC .......... *B60R 21/233* (2013.01); *B60R 21/231* (2013.01); *B60R 21/2338* (2013.01); *B60R 2021/0009* (2013.01); *B60R 2021/23308* (2013.01); *B60R 2021/23324* (2013.01); *B60R 2021/23388* (2013.01)

(58) Field of Classification Search
CPC ............ B60R 21/207; B60R 21/23138; B60R 21/2338; B60R 21/237; B60R 2021/0048; B60R 2021/23382; B60R 2021/2338
USPC ............................................ 280/743.1, 743.2
See application file for complete search history.

(56) References Cited

U.S. PATENT DOCUMENTS

| | | | | |
|---|---|---|---|---|
| 5,913,536 | A * | 6/1999 | Brown | B60R 21/207 280/728.2 |
| 7,549,672 | B2 * | 6/2009 | Sato | B60R 21/207 280/729 |
| 8,636,301 | B1 | 1/2014 | Wang et al. | |
| 8,894,094 | B2 | 11/2014 | Wang et al. | |
| 9,016,718 | B2 * | 4/2015 | Fukawatase | B60R 21/233 280/730.2 |
| 9,266,494 | B2 | 2/2016 | Wang | |
| 9,539,978 | B2 * | 1/2017 | Mazanek | B60R 21/232 |
| 9,744,936 | B2 * | 8/2017 | Kruse | B60R 21/232 |
| 9,994,181 | B1 * | 6/2018 | Dubaisi | B60R 21/207 |
| 10,081,328 | B2 * | 9/2018 | Choi | B60R 21/214 |

(Continued)

*Primary Examiner* — Toan C To
(74) *Attorney, Agent, or Firm* — Matthew D. Thayne; Thayne and Davis LLC

(57) ABSTRACT

Airbag cushions and airbag cushion assemblies comprising mitts or bends for mitigating injuries during oblique impacts. In some embodiments, the cushions may be configured to deploy so as to extend adjacent to an occupant in a vehicle laterally of the occupant and form a mitt configured to receive the occupant's head and/or thorax during an oblique impact event. The airbag cushion may comprise a first portion configured to, upon deployment, extend laterally of the occupant towards a front portion of the vehicle and a second portion configured to, upon deployment, extend at an angle relative to the first portion so as to form the mitt.

17 Claims, 13 Drawing Sheets

(56) References Cited

U.S. PATENT DOCUMENTS

2014/0042732 A1* 2/2014 Taguchi ................ B60R 21/233
            280/729
2014/0203541 A1* 7/2014 Wei ...................... B60R 21/213
            280/730.2
2015/0145234 A1 5/2015 Wang et al.

* cited by examiner

OBLIQUE IMPACT AIRBAG MITTS AND RELATED SYSTEMS AND METHODS

SUMMARY

Injuries associated with oblique load vehicle impacts are often difficult to mitigate, even using current airbag systems. For example, during such impacts, injuries often occur due to an occupant sliding out of a shoulder seat belt and being forced to sprawl across a center console or neighboring seat.

The present inventors have therefore determined that it would be desirable to provide systems and methods that overcome one or more of the foregoing limitations and/or other limitations of the prior art. In some embodiments, the inventive concepts disclosed herein may improve various safety functions of airbag systems, such as, for example, by providing an airbag cushion configured to receive an occupant's head and/or thorax and/or direct the occupant's head to avoid the aforementioned sprawling, such as by directing the occupant's head and/or thorax into another airbag cushion or simply preventing the occupant's head and/or thorax from being forced laterally of the occupant's seat. In some embodiments, this may be accomplished by providing an airbag cushion configured to deploy laterally of an occupant, such as from within the occupant's seat or from a module attached to the occupant's seat, and wrap around the front of the occupant to form a bend or mitt to reduce undesired excursion/sprawling.

In a more particular example of an airbag cushion assembly according to some embodiments, the assembly may comprise an airbag cushion configured to deploy so as to extend adjacent to and laterally of a vehicle occupant and form a mitt configured to receive the occupant's head and/or thorax during an oblique impact event. The airbag cushion may comprise a first portion configured to, upon deployment, extend laterally of the occupant towards a front portion of the vehicle and a second portion configured to, upon deployment, extend at an angle relative to the first portion so as to form the mitt.

In some embodiments, the airbag cushion may further comprise a plurality of elongated chambers. In some such embodiments, each of the plurality of elongated chambers may be defined by a pair of opposing internal panels, wherein each of the opposing internal panels extends from a first side of the airbag cushion to a second side of the airbag cushion opposite from the first side. In some embodiments, the mitt may be defined at least in part by a subset of the plurality of elongated chambers.

In some embodiments, each of the elongated chambers in the subset is defined by a first internal panel extending between the first side of the airbag cushion and the second side of the airbag cushion; and a second internal panel extending between the first side of the airbag cushion and the second side of the airbag cushion. The first distance between the first internal panel and the second internal panel at the first side may be greater than a second distance between the first internal panel and the second internal panel at the second side such that, upon deployment, the positioning of the internal panels in the subset causes the airbag cushion to bend and form the mitt.

Some embodiments may further comprise at least one external tether coupled with the airbag cushion. In some such embodiments, a pretensioner may be coupled with the at least one external tether, which may facilitate formation and/or stabilization of the mitt during deployment. Thus, in some embodiments, the pretensioner may be configured to maintain tension on the airbag cushion during deployment so as to maintain a shape of the mitt upon contact with the occupant's head and/or thorax.

In some embodiments, the angle may be between about 30 degrees and about 130 degrees.

In another example of an airbag cushion assembly, the assembly may comprise an airbag cushion configured to be positioned for deployment from a vehicle seat, such as within the vehicle seat or from a module mounted to the vehicle seat. The assembly may further comprise means for bending the airbag cushion during deployment to form a mitt for receipt of a head and/or thorax of an occupant within the vehicle seat, such as at least one external tether coupled to an exterior surface of the airbag cushion.

Another example of means for bending the airbag cushion during deployment to form a mitt comprises at least one elongated chamber defined by a pair of opposing internal panels, wherein each of the opposing internal panels extends from a first side of the airbag cushion to a second side of the airbag cushion opposite from the first side. In some such embodiments, each pair of opposing internal panels may comprise a first internal panel extending between the first side of the airbag cushion and the second side of the airbag cushion; and a second internal panel extending between the first side of the airbag cushion and the second side of the airbag cushion, wherein a first distance between the first internal panel and the second internal panel at the first side is greater than a second distance between the first internal panel and the second internal panel at the second side such that, upon deployment, the positioning of the opposing internal panels causes the airbag cushion to form the mitt.

In some embodiments, the means for bending the airbag cushion during deployment may comprise an external patch coupled to an exterior surface of the airbag cushion at or adjacent to a first end of the mitt and coupled to the exterior surface of the airbag cushion at or adjacent to a second end of the mitt opposite from the first end. In some such embodiments, the external patch may comprise a first sew line extending along or adjacent to the first end of the mitt from an upper portion of the airbag cushion to a lower portion of the airbag cushion; a second sew line extending along or adjacent to the second end of the mitt from the upper portion of the airbag cushion to the lower portion of the airbag cushion; and a third sew line extending in between the first sew line and the second sew line from the upper portion of the airbag cushion to the lower portion of the airbag cushion.

Some embodiments may further comprise at least one tether coupled to the airbag cushion. Some such embodiments may further comprise a pretensioner coupled to the tether. The pretensioner may be configured to, upon deployment, apply tension to the tether to maintain a desired shape of the mitt.

In some such embodiments, the pretensioner may be coupled to a lower portion of a vehicle seat and the at least one tether may be coupled to the mitt. This may allow the airbag cushion to deploy such that the at least one tether extends in a downward direction to the pretensioner such that the at least one tether anchors the airbag cushion to the lower portion of the vehicle seat during deployment.

In an example of an airbag cushion according to some embodiments, the cushion may comprise a plurality of elongated chambers positioned adjacent to one another and extending from a lower end of the airbag cushion to an upper end of the airbag cushion; and a mitt defined at least in part by a subset of the plurality of elongated chambers, wherein the airbag cushion is configured to deploy by extending in a first direction, bending the airbag cushion to form the mitt, and extending in a second direction at an angle relative to the first direction.

In some embodiments, each of the plurality of elongated chambers may be defined by a pair of opposing internal panels, wherein each of the opposing internal panels extends from a first side of the airbag cushion to a second side of the airbag cushion opposite from the first side.

In some embodiments, each of the elongated chambers in the subset is defined by a first internal panel extending between the first side of the airbag cushion and the second side of the airbag cushion opposite from the first side; and a second internal panel extending between the first side of the airbag cushion and the second side of the airbag cushion, wherein a first distance between the first internal panel and the second internal panel at the first side is greater than a second distance between the first internal panel and the second internal panel at the second side such that, upon deployment, the positioning of the internal panels in the subset causes the airbag cushion to bend and form the mitt.

In some embodiments, a first section of the plurality of elongated chambers comprises a first maximum height extending between the upper end of the airbag cushion and the lower end of the airbag cushion, a second section of the plurality of elongated chambers comprises a second maximum height extending between the upper end of the airbag cushion and the lower end of the airbag cushion, and the first maximum height is greater than the second maximum height. In some such embodiments, the mitt coincides with the first section of the plurality of elongated chambers.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag cushion assemblies comprising airbag cushions configured to form bends and/or mitts for receipt of an occupant's head and/or thorax, which may be particularly useful during oblique impacts to prevent excursion into a lateral seat, door or other structure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
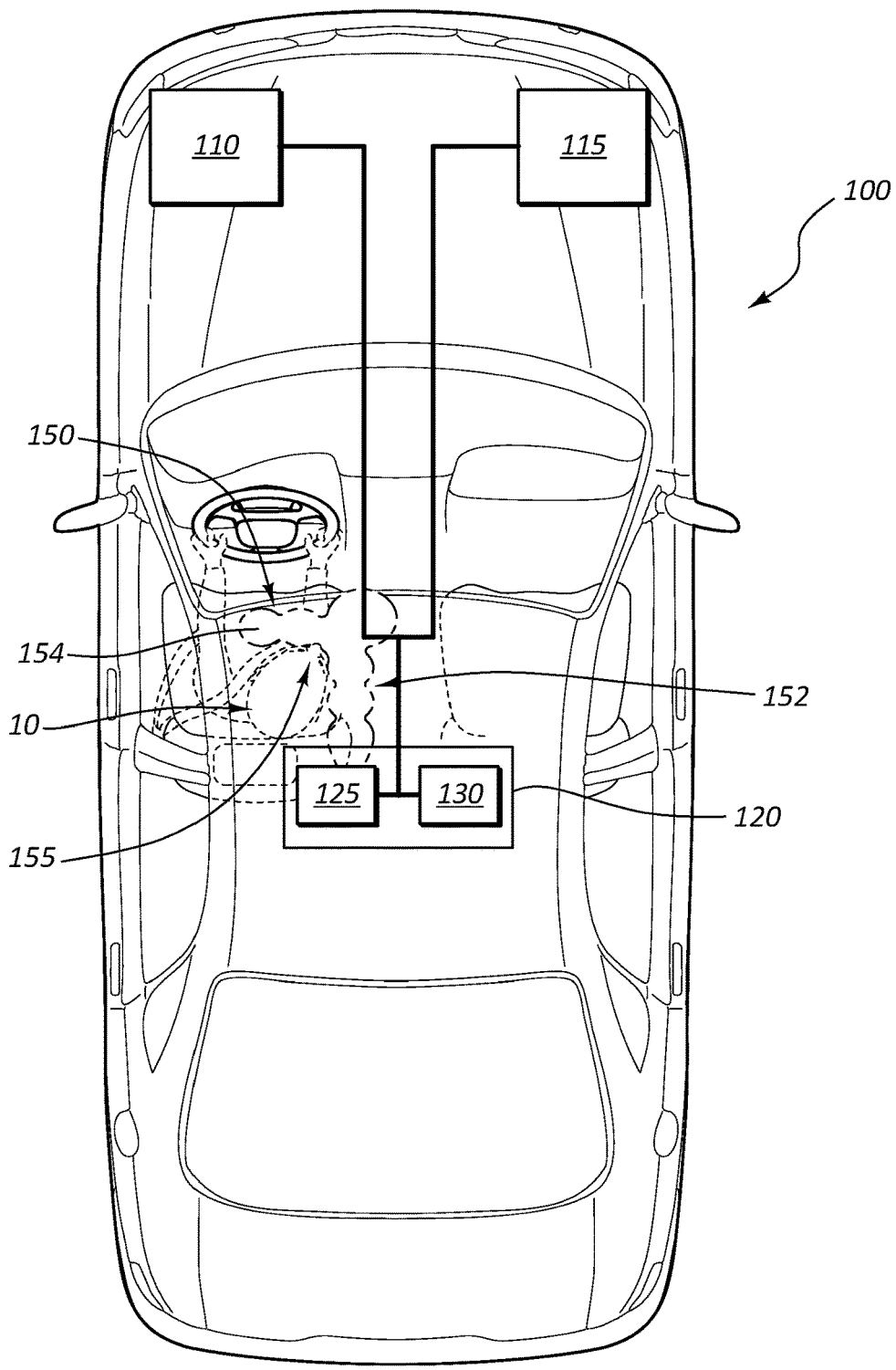
FIG. 1 depicts a vehicle comprising an airbag assembly according to some embodiments.

FIG. 1 depicts a vehicle 100 comprising a first sensor 110 and a second sensor 115. Sensors 110 and 115 may be configured to detect and/or predict various characteristics of a vehicle impact event, such as the direction of the impact angle relative to, for example, the airbag cushion or some other fixed point on the vehicle 100. Sensors 110 and 115 may comprise, for example, accelerometers or other suitable sensors, such as pressure sensors, sound sensors, vibration sensors, and the like. By comparing signals from sensors 110 and 115, a direction of the impact may be determined. For example, one or both of sensors 110 and 115 may be used to predict and/or detect certain oblique angle impact events and, upon detecting such an impact event meeting certain predetermined criteria, such as direction, intensity or force, and/or other parameters, may deploy cushion 150. In some embodiments, pre-crash sensors, such as, for example, cameras, radar, and/or lasers, may be provided as well. Other embodiments are contemplated in which a single sensor or set of sensors may be provided.

In some embodiments, a computer system 120 may be used to coordinate the various signals involved in detecting the impact event and/or deploying cushion 150. In some embodiments, computer system 120 may comprise electronics 125 and memory 130. Electronics 125 may comprise, for example, one or more processors, communications interfaces, and the like, as those of ordinary skill in the art will appreciate. Memory 130 may comprise random access memory (RAM) and/or a non-transitory computer-readable storage medium. In some embodiments, memory 130 may be programmable or otherwise manipulable by a technician or user to, for example, input one or more variables to alter the operation of the safety system.

In some embodiments, computer system 120 may be a pre-existing computer system of vehicle 100. Alternatively, computer system 120 may be specifically part of a safety system for displacing an airbag cushion during or prior to an impact event. In some such embodiments, computer system 120 may be configured to interface with the existing vehicle computer system. The various components of the computer system 120 may be implemented using hardware, software, firmware, and/or any combination thereof.

FIG. 1 depicts cushion 150 following full deployment. Because cushion 150 is positioned on the right-hand side of occupant 10, this deployment may be the result of sensors 110 and/or 115 detecting an oblique-angle impact event from the right side of vehicle 100. As described below, in some embodiments, another cushion (not shown in FIG. 1) may be configured to deploy from the left side of occupant 10 in order to protect against oblique-angle impacts from the left side of vehicle 100. In addition, it is contemplated that some embodiments may be configured to deploy one or more airbags upon detecting a sufficient impact irrespective of angle and therefore may not require sensors 110 and 115.

As also depicted in FIG. 1, cushion 150 comprises a first straight, or at least substantially straight, section 152, a second straight, or at least substantially straight, section 154, which extends at an angle with respect to the first section 152, and, as described in greater detail below, comprises a mitt 155 positioned in between the first section 152 and the second section 154. Thus, as described in greater detail below, cushion 150 may be configured to deploy so as to bend or curve around the driver/occupant during deployment so as to position the mitt 155 in a desired location for receiving the driver/occupant's head and/or thorax during an impact event and/or may guide the occupant's head and/or thorax into another cushion, such as a front airbag cushion.

Figure 2:
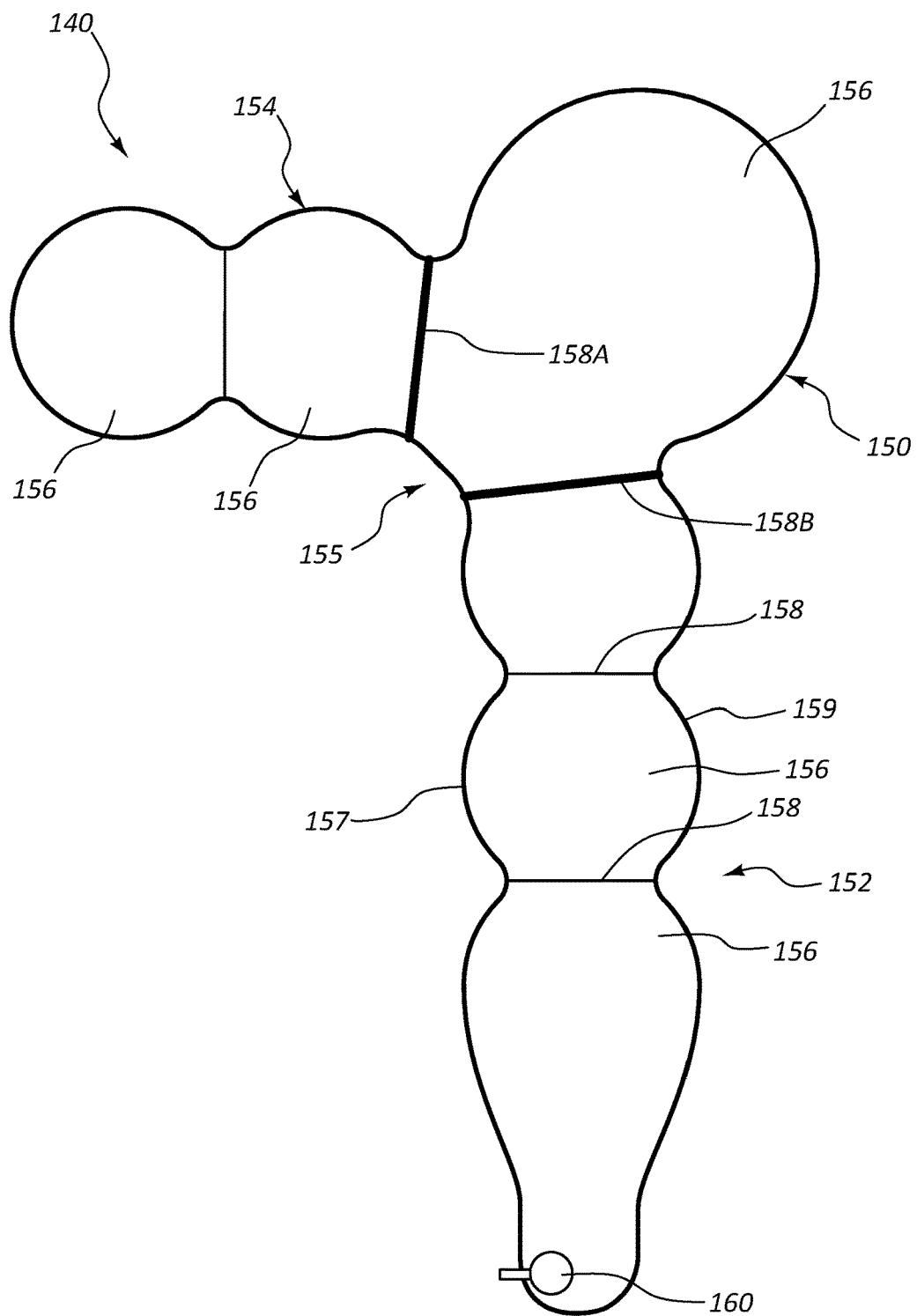
FIG. 2 depicts an airbag cushion according to some embodiments.

FIG. 2 depicts a cross-sectional view of an airbag assembly 140 according to some embodiments. Airbag assembly 140 comprises cushion 150 and inflator 160. As better seen in this figure, cushion 150 comprises a plurality of chambers 156. All of chambers 156 other than the two outermost chambers are defined by a pair of opposing internal panels 158. Each of internal panels 158 extends from a first side 157 of the airbag cushion 150 to a second side 159 of the airbag cushion 150 opposite from the first side 157. In some embodiment, panels 158 may comprise fabric panels that extend fully, or at least substantially fully, from the bottom to the top end of the cushion 150. Alternatively, panels 158 may comprise one or more internal straps or tethers. As depicted in FIG. 2, panels 158 may provide rigidity by defining internal chambers 156 and may, in some embodiments, inhibit or limit intrusion of cushion 150 into the occupant's ribs.

In preferred embodiments, the first section 152 may extend from the second section 154 at an angle of between about 20 degrees and about 130 degrees. In more preferred such embodiments, the first section 152 may extend from the second section 154 at an angle of about 90 degrees.

In the embodiment of FIG. 2, the placement of internal panels 158 may be used to form the bend between first section 152 and second section 154 and thereby form mitt 155. To explain, by coupling panels 158A and 158B closer together at first side 157, which is the side that will ultimately impact an occupant, than at second side 159, cushion 150 is forced to bend as it is inflated. By adjusting the positioning of panels/tethers 158, the angle between first section 152 and second section 154 and/or the size, shape, and/or position of mitt 155 may be adjusted as desired. In addition, although only two internal panels/tethers 158A and 158B are depicted in FIG. 2 as defining mitt 155, those of ordinary skill in the art, after having received the benefit of this disclosure, will appreciate that other numbers of internal panels may be used, both to define mitt 155 and elsewhere within cushion 150, as desired. Panels 158A and 158B comprise an example of means for bending an airbag cushion during deployment to form a mitt for receipt of a head and/or thorax of an occupant within the vehicle seat.

Figure 3:
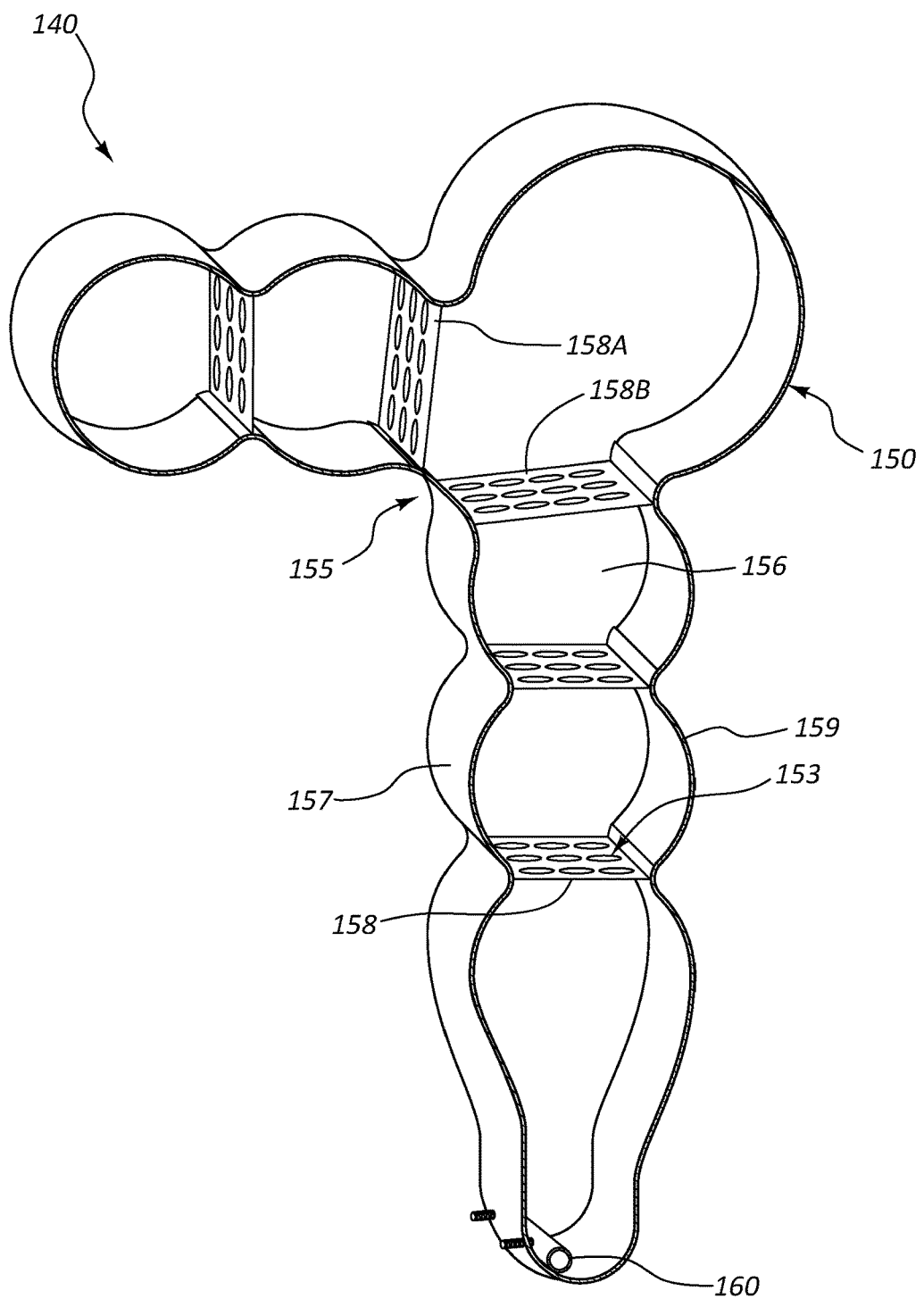
FIG. 3 is a cross-section view of the airbag cushion of FIG. 2.

FIG. 3 is a cross-sectional view of the airbag cushion 150 of FIG. 2. As shown in this figure, each of the various internal panels 158 comprises a plurality of spaced apart vent openings 153 to allow inflation gas to flow between chambers 156 and inflate the entire cushion 150. The size, location, and spacing of these vent openings 153 may also be used to control inflation kinematics as desired. For example, vent openings 153 may be used to pace the inflation of cushion 150 to allow previous/proximal chambers to inflate to set up inflation of later/distal chambers during inflation.

Figure 4:
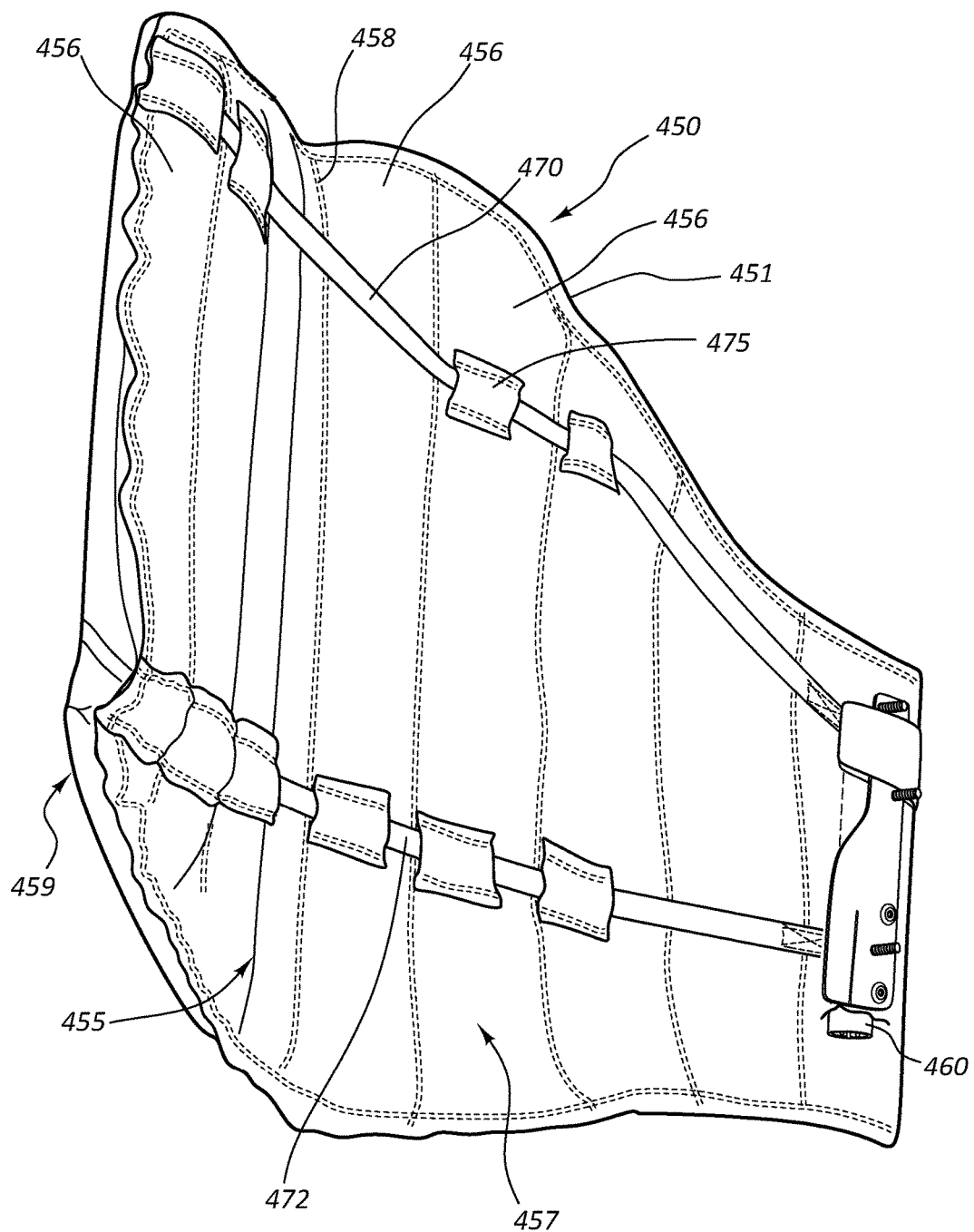
FIG. 4 is a perspective view of an airbag cushion according to other embodiments.

FIG. 4 is a perspective view of an airbag cushion 450 according to other embodiments. As shown in this figure, like cushion 150, cushion 450 also comprises a plurality of chambers 456 each defined by a pair of opposing internal panels 458. Again, each of internal panels 458 extends from a first side 457 of the airbag cushion 450 to a second side 459 of the airbag cushion 450 opposite from the first side 457. Also, as better seen in this figure, each of chambers 456 comprises a vertical chamber in that they extend vertically from a lower portion of a vehicle to an upper portion of the vehicle following deployment.

However, unlike airbag cushion 150, airbag cushion 450 comprises a pair of external tethers, namely, an upper external tether 470 and a lower external tether 472, both of which extend along the first or inner side 457 of airbag cushion 450. Tethers 470 and 472 extend through a plurality of external patches 475, which may be used to keep tethers 470 and 472 in desired locations to control deployment kinematics and form mitt 455. For example, by making tethers 470/472 shorter than the inner side 457 of airbag cushion 450, providing a larger gap between adjacent patches 475 at a location where mitt 455 is to be formed, and/or positioning one or more tethers, such as tethers 470/472, at desired locations, various aspects of the mitt 455 may be tuned as desired, such as the distance between the deployment location and mitt 455, the angle of curvature of mitt 455, and the stability/rigidity of mitt 455 to receive an occupant's head and/or thorax and/or direct the occupant's head and/or thorax into a frontal airbag cushion without undue deformation. Tethers 470 and 472 are examples of means for bending an airbag cushion during deployment to form a mitt for receipt of a head and/or thorax of an occupant within the vehicle seat.

As also shown in FIG. 4, some embodiments may comprise distal section that is configured to deploy to a greater height (relative to an occupant) than a proximal (relative to inflator 460) section of the airbag cushion 450. In some such embodiments, this may be accomplished by providing a vertical taper 451. This taper, or a plurality of such tapers, may extend from a portion of the cushion 450 that is configured to extend laterally and project distally relative to an occupant and may terminate at or adjacent to mitt 455. Alternatively, this taper may terminate at the distal end of cushion 450. As will be more readily apparent after considering later figures, this taper may be useful to allow the airbag cushion 450 to project upwards at or near the mitt 455 to provide a better foundation for receiving an occupant's head and/or thorax. This may be particularly helpful in connection with embodiments configured to deploy from a seat, since aside from the headrest, often car seats do not extend up to the highest level of a typical driver/occupant's head.

Figure 5:
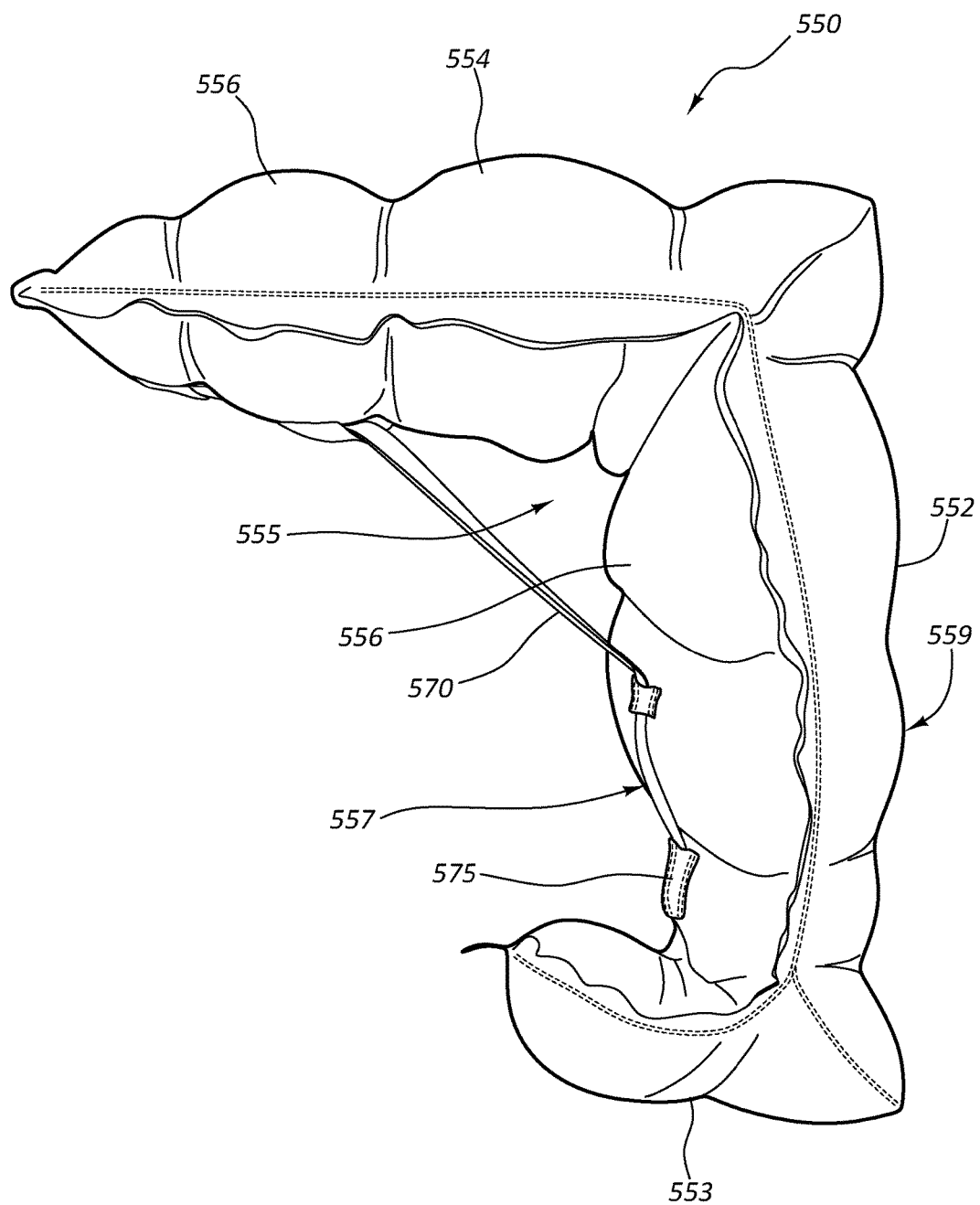
FIG. 5 is an upper plan view of an airbag cushion according to still other embodiments.

FIG. 5 depicts yet another alternative embodiment of an airbag cushion 550 configured to form a mitt 555 upon deployment. Airbag cushion 550 is similar to airbag cushion 450 except only a single external tether 570 is used to facilitate formation of mitt 555, maintain a desired shape of mitt 555, and/or provide support to mitt 555 during deployment. Tether 570 is another example of a means for bending an airbag cushion during deployment to form a mitt for receipt of a head and/or thorax of an occupant within the vehicle seat.

Tether 570 may extend through one or more patches 575 defining tunnels, as previously mentioned. In addition, airbag cushion 550 comprises three sections that are angled relative to one another. More particularly, section 552 extends at an angle relative to section 554 to form mitt 555 therebetween. In addition, section 553 extends at an angle relative to section 552. Section 553 may be used to house an inflator (not shown) and therefore may project laterally from a deployment location (typically a car seat). As previously mentioned, section 552 may, in preferred embodiments, extend at an angle of between about 20 degrees and about 130 degrees relative to section 554 (in more preferred embodiments at an angle of about 90 degrees). Similarly, section 553 may extend at an angle of between about 20 degrees and about 130 degrees relative to section 552.

Otherwise airbag cushion 550 is similar to airbag cushion 450. Thus, airbag cushion 550 comprises a plurality of vertical chambers.

each defined by a pair of opposing internal panels (not shown in FIG. 5). Again, each of these internal panels extends from a first or inner side 557 of the airbag cushion 550 to a second or outer side 559 of the airbag cushion 550 opposite from the first side 557. Of course, other features/elements described herein may be used, either in combination with tether 570 or as alternative to tether 570, to facilitate formation of mitt 555 and/or facilitate stabilization of mitt 555. For example, as previously described, the internal panels of airbag cushion 550 may be spaced/coupled with the opposing sides of airbag cushion 550 in the vicinity of mitt 555 to facilitate formation and/or maintenance of mitt 555 during deployment.

Figure 6:
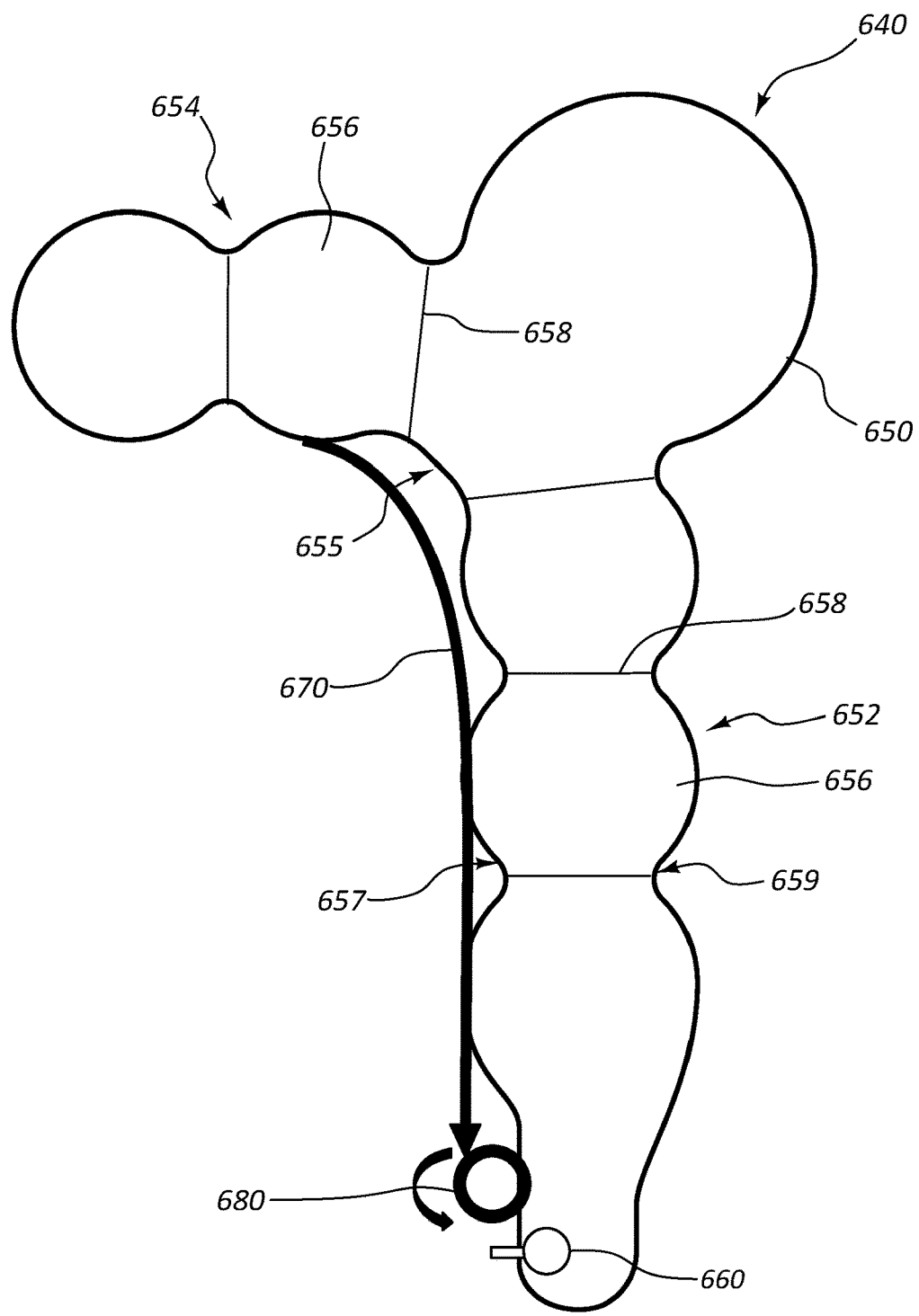
FIG. 6 depicts an airbag cushion comprising an external tether and a pretensioner according to some embodiments.

FIG. 6 a cross-sectional view of another airbag assembly 640 according to some embodiments. Airbag assembly 640 is similar to airbag assembly 140 with one exception, namely, airbag assembly 640 comprises an external tether 670 that is coupled with a pretensioner assembly 680. Pretensioner assembly 680 may comprise a pretensioner similar to those typically used in connection with seat belts. Thus, pretensioner assembly 680 may comprise, for example, an initiator and a pyrotechnic element to provide a force of sufficient magnitude to tighten the external tether 670 in a relatively short amount of time. Pretensioner 680 may also comprise a retractor spool or other rotational means to wind in external tether 670 upon actuation of the initiator. Tether 670 and pretensioner 680 are examples of means for bending an airbag cushion during deployment to form a mitt for receipt of a head and/or thorax of an occupant within the vehicle seat.

As discussed in greater detail below, preferably pretensioner 680 is mounted or otherwise coupled with a load-bearing part of a vehicle, such as to a vehicle seat. Thus, upon actuation, pretensioner 680 may apply a suitable tension to airbag cushion 650 during inflation to facilitate formation and/or stabilization of mitt 655. In some embodiments, pretensioner 680 may also be attached to a proximal portion of airbag cushion 650. Alternatively, or additionally, a suitable patch or patches may be applied to the external surface of airbag cushion 650 and pretensioner 680 may only be directly coupled with a seat or other suitable load-bearing fixture within a vehicle.

Otherwise, airbag assembly 640 may be similar to airbag assembly 140. Thus, airbag assembly 640 comprises cushion 650 and inflator 660. Cushion 650 again comprises a plurality of chambers 656, each of which may be defined by opposing internal panels 658 that extend from a first side 657 to a second side 659 of the airbag cushion 650.

Also, as previously described, the placement of internal panels 658 may, in some embodiments, be used along with one or more external tethers, such as external tether 670, to form the bend between a first section 652 and a second section 654 of airbag cushion 650 and thereby form mitt 655.

Figure 7:
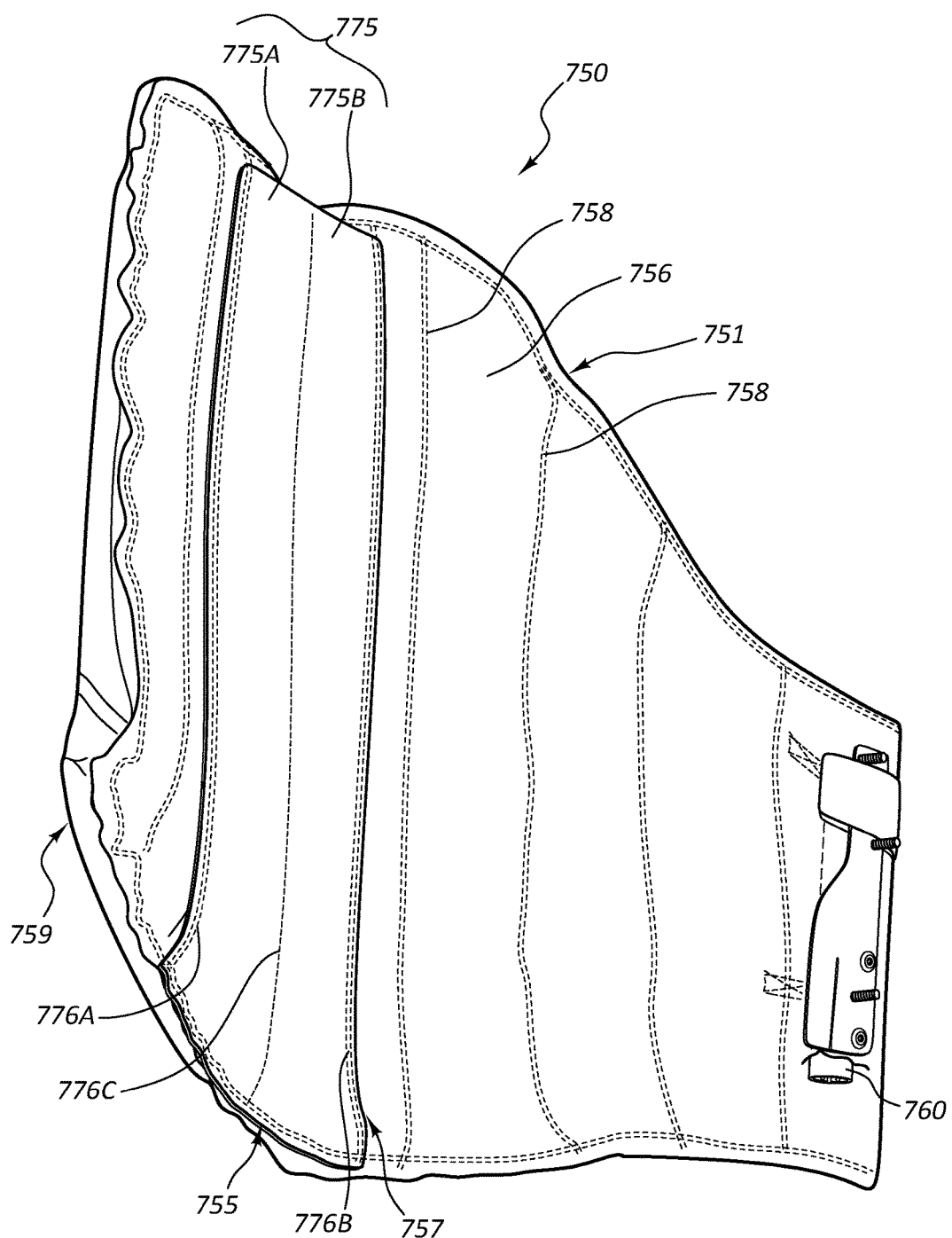
FIG. 7 is a perspective view of an airbag cushion comprising an external patch according to other embodiments.

FIG. 7 depicts yet another airbag cushion 750 according to other embodiments. Airbag cushion 750 is similar to airbag cushion 450 other than the means for bending airbag cushion 750 during deployment to form a mitt 755 for receipt of a head and/or thorax of an occupant within a vehicle seat from which airbag cushion 750 deploys or to which airbag cushion 750 is coupled prior to deployment. More particularly, rather than providing one or more external tethers, airbag cushion 750 comprises an external patch 775 coupled to an inner surface 757 of airbag cushion 750 in the desired region of mitt 755. In preferred embodiments, external patch 775 may be sewn or otherwise coupled with inner surface 757 in a manner such that a center of mitt 755 is positioned at the center of patch 775. Patch 775 is an example of a means for bending an airbag cushion during deployment to form a mitt for receipt of a head and/or thorax of an occupant within the vehicle seat.

In preferred embodiments, patch 775 may be defined by two separate patches during manufacturing that are then coupled together prior to completion of the assembly process. To illustrate, patch 775 may comprise a first half or portion 775A and a second half or portion 775B. Initially, portions 775A and 775B may be sewn or otherwise coupled to airbag cushion 750 at sew/attachment lines 776A and 776B, respectively. Then, prior to folding airbag cushion 750 into an airbag module or otherwise putting airbag cushion 750 into its final form for delivery and/or installation, portion 775A may be sewn or otherwise coupled with portion 775B along sew/attachment line 776C.

Otherwise, airbag cushion 750 may be similar to airbag assembly 450. Thus, airbag assembly 750 comprises a plurality of vertical chambers 756 each defined by a pair of opposing internal panels 758 and may be configured for inflation using inflator 760. Again, each of internal panels 758 extends from a first side 757 of the airbag cushion 750 to a second side 759 of the airbag cushion 750 opposite from the first side 757. In some embodiments, at least a subset of internal panels 758 may be coupled in a manner to provide further stability and/or further facilitate formation of mitt 755 during deployment, as previously discussed. Cushion 750 further comprises a taper 751 adjacent to mitt 755, as also previously discussed.

Figure 8:
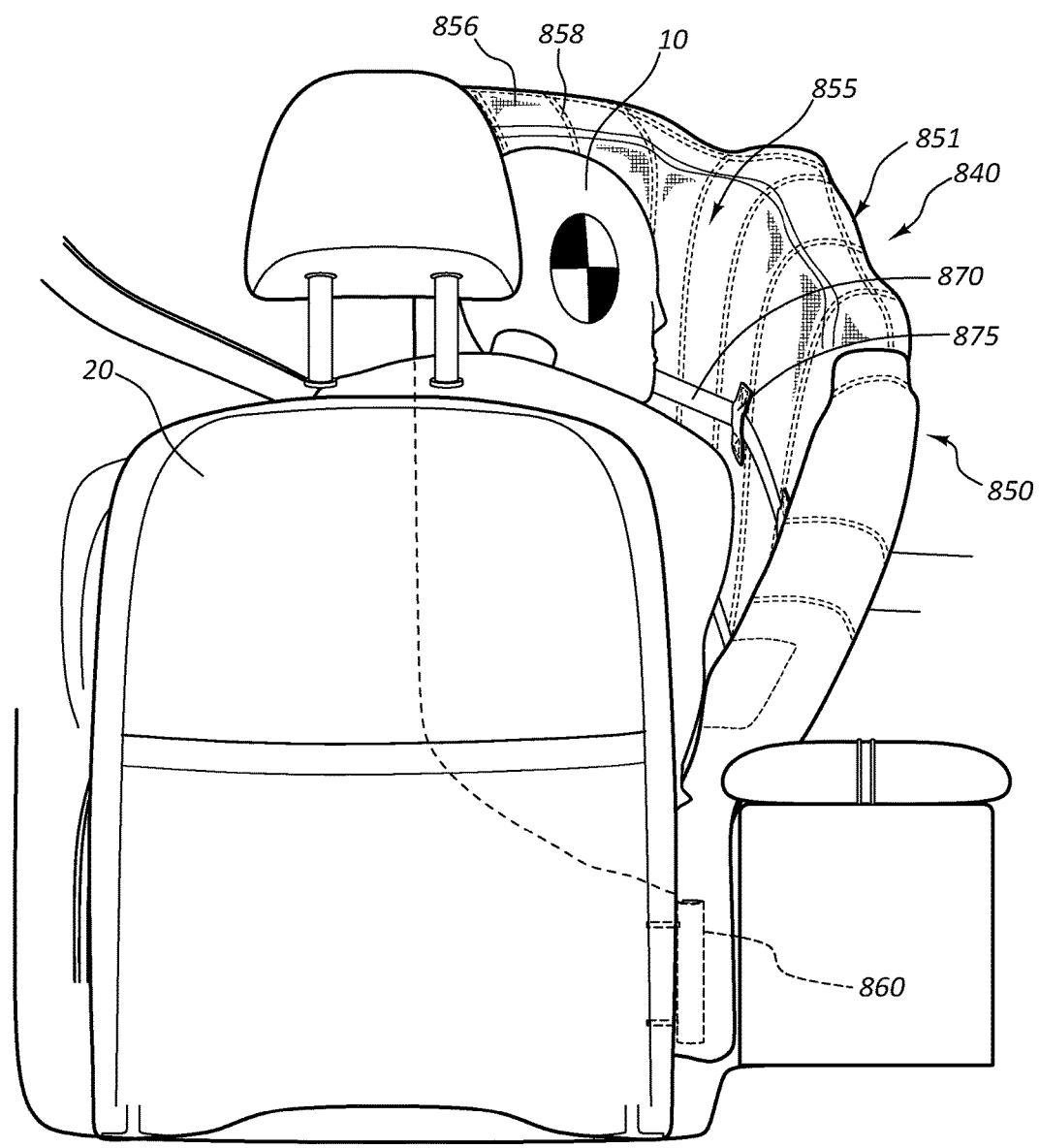
FIG. 8 depicts an example of an airbag cushion according to some embodiments being deployed in a vehicle.

FIG. 8 depicts the interior of a vehicle comprising an airbag assembly 840 according to some embodiments during deployment of airbag cushion 850. As shown in this figure, airbag cushion 850 may be deployed from within an inflator 860 mounted on or within seat 20 of a vehicle. In the depicted embodiment, seat 20 is a driver seat and occupant 10 a driver. However, it is contemplated that, in other embodiments, various airbag cushions described herein may be deployed from other seats, such as passenger seat and/or rear seat. In addition, although preferred embodiments are deployed from within or attached to a car seat, it is contemplated that, after receiving the benefit of this disclosure, those of ordinary skill in the art may be able to deploy the airbag cushions disclosed herein in other suitable locations, such as a vehicle center console, within a vehicle door, and the like.

As depicted in FIG. 8, airbag cushion deploys from seat 20 (either from within seat 20 or from a module attached to a surface of seat 20), extends laterally along the right side of occupant 10, and then wraps around to the left in front of occupant 10 to form a mitt 855 for receipt of the head and/or thorax of occupant 10. In addition, as previously described, airbag cushion 850 comprises a plurality of vertical chambers 856 defined by opposing internal panels 858, which may comprise sheets of fabric or straps/tethers. In addition, an external tether 870 is positioned through a plurality of patches 875 to direct the tether 870 along airbag cushion 850 from the region of mitt 855 along the left side of the cushion 850 to the right side adjacent to the deployment location. FIG. 8 also depicts a tapering section 851 of cushion 850 that may allow cushion 850 to inflate so as to rise to or above the level of a typical occupant's head and/or thorax. As previously mentioned, in some embodiments, external tether 870 may be coupled with a pretensioner (not shown in FIG. 8) to assist with creation and/or maintenance of mitt 855. Tether 870 is an example of a means for bending an airbag cushion during deployment to form a mitt for receipt of a head and/or thorax of an occupant within the vehicle seat.

Figure 9:
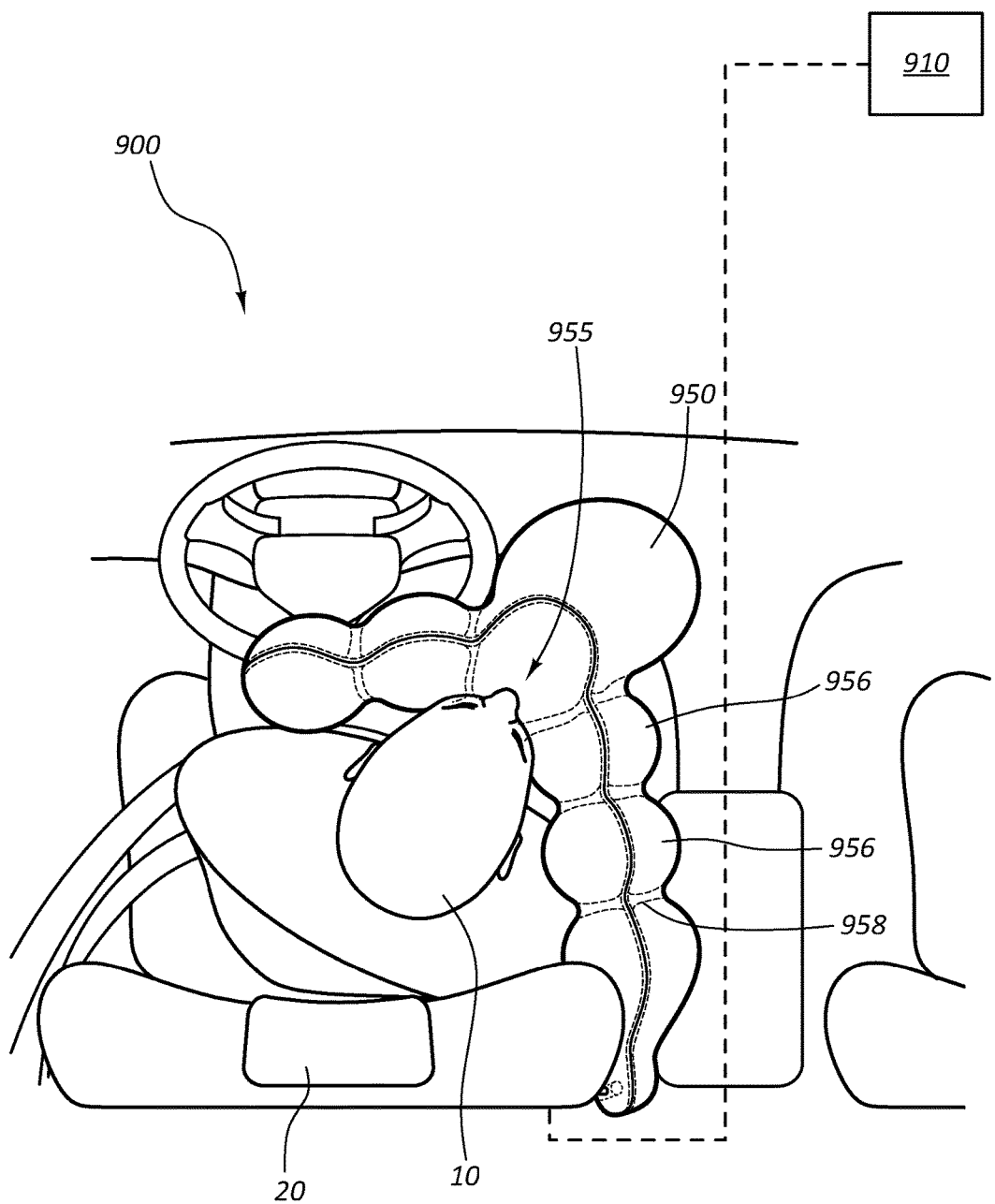
FIG. 9 is an upper plan view of a vehicle incorporating an airbag assembly during deployment.

FIG. 9 depicts another example of vehicle 900 comprising an airbag assembly according to other embodiments. As shown in this figure, airbag cushion 950 again, upon deployment, bends in front of occupant 10 to define a mitt 955 for receipt of the occupant's head and/or thorax. Also, cushion 950 may comprise a plurality of vertical chambers 956 defined by a plurality of internal panels 958. Cushion 950 is deployed from a right side of seat 20. Because cushion 950 deploys from this internal side of occupant 10 and seat 20, this deployment may result from receipt of a signal from one or more sensors, such as sensor 910, that detect or predict an impact having certain characteristics, such as an oblique-angle impact from the right side of vehicle 900.

Figure 10:
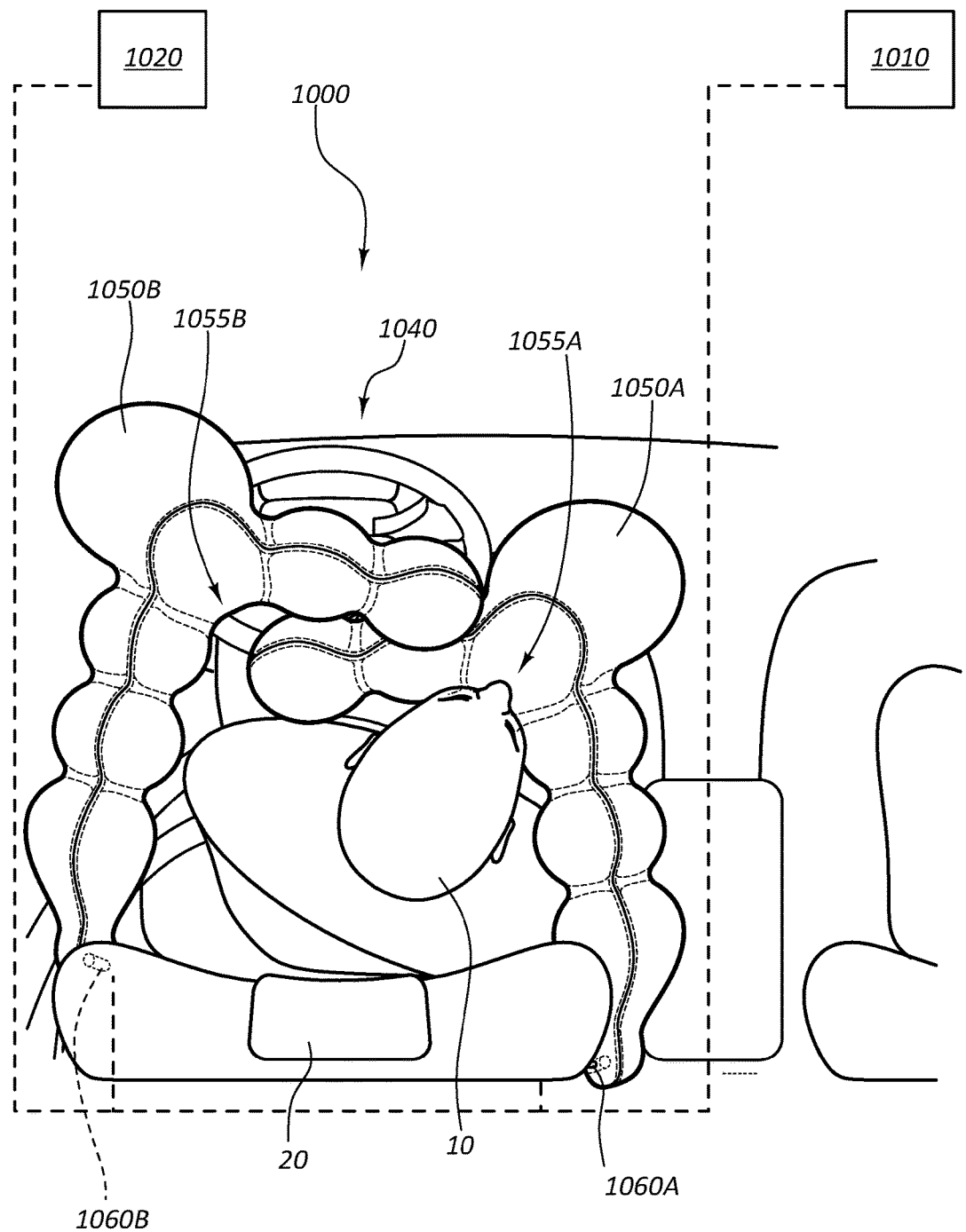
FIG. 10 is an upper plan view of a vehicle incorporating an alternative airbag assembly comprising two airbag cushions during deployment.

However, in other embodiments, another airbag may be configured to deploy from the opposite side. Thus, as depicted in FIG. 10, vehicle 1000 may be configured with an airbag assembly 1040 configured to deploy a right-side airbag cushion 1050A and a left side airbag cushion 1050B. Airbag assembly 1040 may be configured to deploy cushions 1050A and 1050B together (either sequentially or simultaneously during a single crash) or, alternatively, may be configured to deploy only one of cushions 1050A and 1050B, depending upon the characteristics of the impact.

For example, airbag cushion 1050B may be communicatively coupled with sensor 1020 and airbag cushion 1050A may be communicatively coupled with sensor 1010. Thus, upon detecting a left-side oblique impact, cushion 1050B may deploy and upon detecting a right-side oblique impact, cushion 1050A may deploy. Alternatively, airbag assembly 1040 may be configured to deploy both cushions together (again, either sequentially or simultaneously during a single crash), either depending upon the impact characteristics or as a matter of course during any impact. Cushions 1050A and 1050B may be configured to nest relative to one another. For example, as depicted in FIG. 10, cushion 1050B may be configured to deploy to a greater distance relative to occupant 10 and/or seat 20 relative to cushion 1050A such that the bent/mitt regions of the two cushions extend parallel, or at least substantially parallel, to one another. As also depicted in FIG. 10, in some embodiments, cushions 1050A and 1050B may comprise distinct inflators, namely, inflators 1060A and 1060B, respectively.

Figure 11:
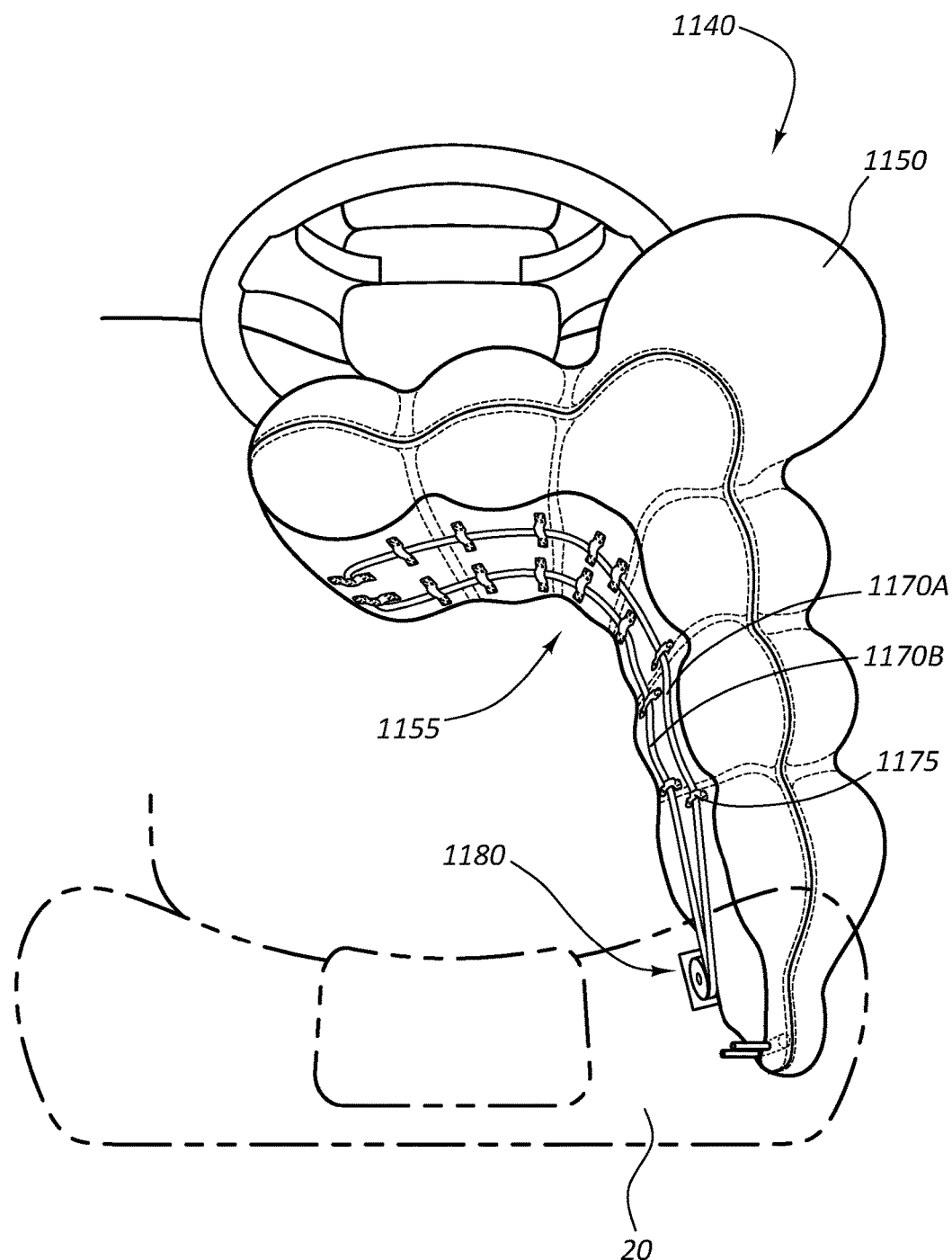
FIG. 11 depicts yet another example of an airbag cushion comprising two tethers and a pretensioner during deployment.

FIG. 11 depicts yet another example of an airbag assembly 1140 according to other embodiments. As shown in this figure, airbag cushion 1150 may comprise a pair of external tethers, namely, tethers 1170A and 1170B, both of which may extend through a series of external tunnel patches 1175 and both of which are coupled to a single pretensioner 1180. Pretensioner 1180 may be fixed to seat 20 and actuated during deployment of airbag cushion 1150 to facilitate formation and/or maintenance of mitt 1155, as previously discussed. In some embodiments, pretensioner 1180 may be fixed to the bottom of seat 20 or at least a lower portion of seat 20 so that pretension 1180 and tethers 1170A and 1170B may also be used to anchor airbag cushion 1150 to a foundation below the inflator used to inflate cushion 1150. Although tethers 1170A and 1170B are shown as separate tethers, in alternative embodiments these tethers may be linked together, such as at the end adjacent pretensioner 1180 and/or at the distal end of the tethers. Tethers 1170A and 1170B, along with pretensioner 1180, comprise examples of means for bending an airbag cushion during deployment to form a mitt for receipt of a head and/or thorax of an occupant within the vehicle seat.

Figure 12:
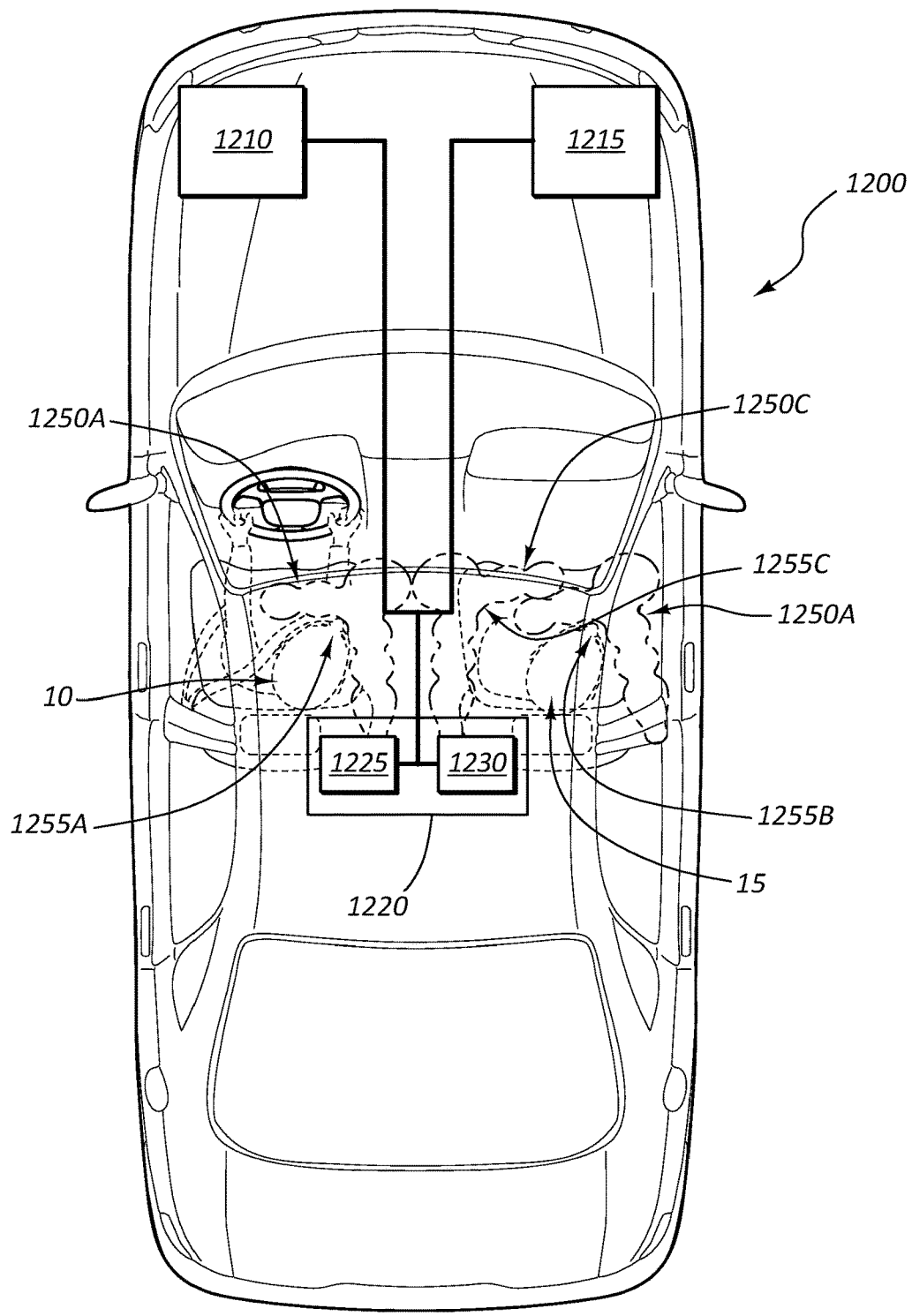
FIG. 12 depicts a vehicle comprising an airbag assembly according to another embodiment.

FIG. 12 depicts another embodiment of a vehicle incorporating an airbag cushion assembly, namely vehicle 1200. Vehicle 1200 is similar to vehicle 100 except two additional airbag cushions are configured to deploy from adjacent a passenger 15 seat. Of course, those of ordinary skill in the art will appreciate that two cushions may be configured to deploy from driver 10 seat as well, if desired, either together or separately depending upon the characteristics of a particular impact. Vehicle 1200 may again comprise one or more sensors, such as sensors 1210 and 1215. Sensors 1210 and/or 1215 may be configured to detect and/or predict various characteristics of a vehicle impact event, such as the direction of the impact angle relative to, for example, the airbag cushion or some other fixed point on the vehicle 1200.

Vehicle 1200 further comprises a computer system 1220 may be used to coordinate the various signals involved in detecting the impact event and/or deploying one or more of the various cushions 1250A, 1250B, and 1250C of vehicle 1200. In some embodiments, computer system 1220 may comprise electronics 1225 and memory 1230. Electronics 1225 may comprise, for example, one or more processors, communications interfaces, and the like, as those of ordinary skill in the art will appreciate. Memory 1230 may comprise random access memory (RAM) and/or a non-transitory computer-readable storage medium. In some embodiments, memory 1230 may be programmable or otherwise manipulable by a technician or user to, for example, input one or more variables to alter the operation of the safety system.

In some embodiments, computer system 1220 may be a pre-existing computer system of vehicle 1200. Alternatively, computer system 1220 may be specifically part of a safety system for displacing an airbag cushion during or prior to an impact event. In some such embodiments, computer system 1220 may be configured to interface with the existing vehicle computer system. The various components of the computer system 1220 may be implemented using hardware, software, firmware, and/or any combination thereof.

FIG. 12 depicts cushions 1250A, 1250B, and 1250C following full deployment. These cushions may be configured to deploy together or, alternatively, may be configured to deploy separately without deploying other cushions depending upon the characteristics of the impact detected by one or more sensors, such as sensors 120 and/or 1215. For example, in some embodiments and implementations, upon detecting an oblique-angle impact event from the right side of vehicle 1200, cushions 1250A and 1250B may be configured to deploy without also deploying cushion 1250C.

As also depicted in FIG. 12, each of the various cushions 1250A-C may comprise a respective mitt 1255A-C, respectively, positioned in between two adjacent, connecting sections of the cushion. Thus, each of cushions 1250A-C may be configured to deploy so as to bend or curve around the driver 10 (with respect to cushion 1250A) or passenger 15 (with respect to cushions 1250B and 1250C) during deployment so as to position the respective mitt in a desired location for receiving the driver/passenger's head and/or thorax during an impact event and/or may guide the occupant's head and/or thorax into another cushion, such as a front airbag cushion.

Figure 13:
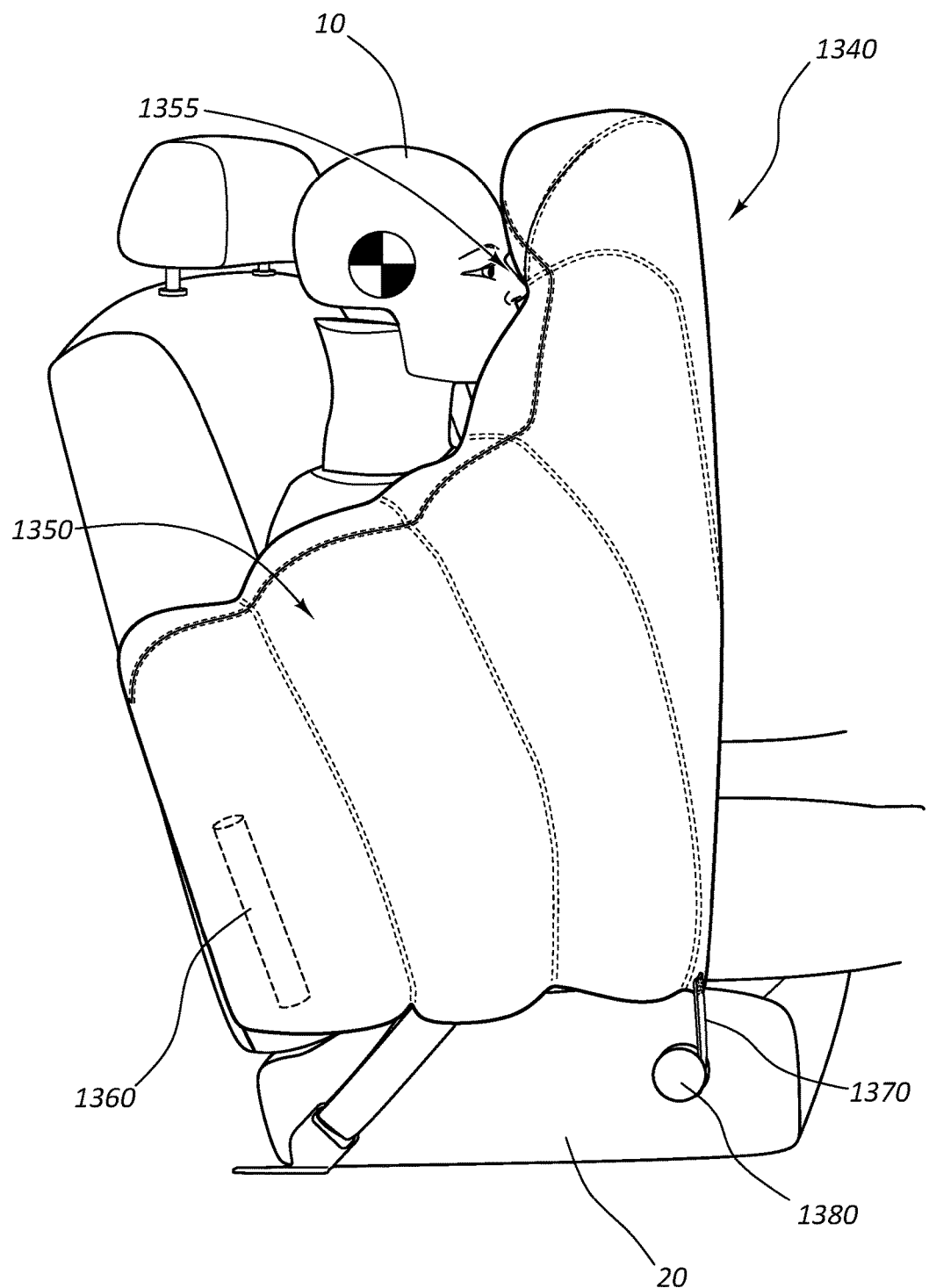
FIG. 13 is a perspective view of an airbag assembly according to still other embodiments following deployment.

FIG. 13 depicts yet another example of an airbag cushion assembly 1340 according to some embodiments. Assembly 1340 comprises an airbag cushion 1350 and is shown following deployment. As shown in this figure, airbag cushion 1350 may be deployed from an inflator 1360 mounted on or within seat 20 of a vehicle. In the depicted embodiment, seat 20 is a driver seat and occupant 10 a driver. However, as previously mentioned, various airbag cushions described herein may be deployed from other seats, such as passenger seat and/or rear seat for example, or from within a vehicle center console, within a vehicle door, etc.

As depicted in FIG. 13, airbag cushion deploys from seat 20 (either from within seat 20 or from a module attached to a surface of seat 20), extends laterally along the right side of occupant 10, and then wraps around to the left in front of occupant 10 to form a mitt 1355 for receipt of the head and/or thorax of occupant 10. In addition, as previously described, airbag cushion 1350 may, in preferred embodiments, comprise a plurality of vertical chambers defined by opposing internal panels, such as sheets of fabric or straps/tethers.

In addition, an external tether 1370 is coupled between airbag cushion 1350 and a pretensioner 1380. More particularly, pretensioner 1380 is coupled to a bottom portion of seat 20 and tether 1370 is coupled to pretensioner 1380 and at the opposite end to a bottom of mitt 1355. This configuration may allow for anchoring the deployed cushion 1350 in place relative to seat 20 or another desired fixture within a vehicle during and/or following deployment. Of course, pretensioner 1380 and/or tether 1370 may be coupled at alternative locations as desired to direct deployment and/or anchor the cushion as desired/needed.

FIG. 13 also depicts a tapering section between inflator 1360 and mitt 1355, which, as previously mentioned, may allow cushion 1350 to inflate so as to rise as it deploys from the side of seat 20 to occupant 10 to the level of, or above the level of, a typical occupant's head and/or thorax.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An airbag cushion assembly, comprising:
    an airbag cushion configured to deploy so as to extend adjacent to an occupant in a vehicle laterally of the occupant and form a mitt configured to receive at least one of the occupant's head the occupant's thorax during an oblique impact event, wherein the airbag cushion comprises:
        a first portion configured to, upon deployment, extend laterally of the occupant towards a front portion of the vehicle; and
        a second portion configured to, upon deployment, extend at an angle relative to the first portion so as to form the mitt;
    at least one external tether coupled with the airbag cushion; and
    a pretensioner coupled with the at least one external tether.

2. The airbag cushion assembly of claim 1, wherein the airbag cushion further comprises a plurality of elongated chambers.

3. The airbag cushion assembly of claim 2, wherein each of the plurality of elongated chambers is defined by a pair of opposing internal panels, and wherein each of the opposing internal panels extends from a first side of the airbag cushion to a second side of the airbag cushion opposite from the first side.

4. The airbag cushion assembly of claim 3, wherein the mitt is defined at least in part by a subset of the plurality of elongated chambers.

5. The airbag cushion assembly of claim 4, wherein each of the elongated chambers in the subset is defined by:
    a first internal panel extending between the first side of the airbag cushion and the second side of the airbag cushion; and
    a second internal panel extending between the first side of the airbag cushion and the second side of the airbag cushion, wherein a first distance between the first internal panel and the second internal panel at the first side is greater than a second distance between the first internal panel and the second internal panel at the second side such that, upon deployment, the positioning of the internal panels in the subset causes the airbag cushion to bend and form the mitt.

6. The airbag cushion assembly of claim 1, wherein the pretensioner is configured to maintain tension on the airbag cushion during deployment so as to maintain a shape of the mitt upon contact with the occupant's head.

7. The airbag cushion assembly of claim 1, wherein the angle is between about 20 degrees and about 130 degrees.

8. An airbag cushion assembly, comprising:
an airbag cushion configured to be positioned for deployment from a vehicle seat; and
means for bending the airbag cushion during deployment to form a mitt for receipt of at least one of a head of an occupant and a thorax of the occupant within the vehicle seat, wherein the means for bending the airbag cushion during deployment comprises an external patch coupled to an exterior surface of the airbag cushion at or adjacent to a first end of the mitt and coupled to the exterior surface of the airbag cushion at or adjacent to a second end of the mitt opposite from the first end, and wherein the external patch comprises:
a first sew line extending along or adjacent to the first end of the mitt from an upper portion of the airbag cushion to a lower portion of the airbag cushion;
a second sew line extending along or adjacent to the second end of the mitt from the upper portion of the airbag cushion to the lower portion of the airbag cushion; and
a third sew line extending in between the first sew line and the second sew line from the upper portion of the airbag cushion to the lower portion of the airbag cushion.

9. The airbag cushion assembly of claim 8, wherein the means for bending the airbag cushion during deployment further comprises:
at least one elongated chamber defined by a pair of opposing internal panels, wherein each of the opposing internal panels extends from a first side of the airbag cushion to a second side of the airbag cushion opposite from the first side, and wherein each pair of opposing internal panels comprises:
a first internal panel extending between the first side of the airbag cushion and the second side of the airbag cushion; and
a second internal panel extending between the first side of the airbag cushion and the second side of the airbag cushion, wherein a first distance between the first internal panel and the second internal panel at the first side is greater than a second distance between the first internal panel and the second internal panel at the second side such that, upon deployment, the positioning of the opposing internal panels causes the airbag cushion to form the mitt.

10. The airbag cushion assembly of claim 8, wherein the means for bending the airbag cushion during deployment further comprises at least one external tether coupled to an exterior surface of the airbag cushion.

11. The airbag cushion assembly of claim 8, further comprising:
at least one tether coupled to the airbag cushion; and
a pretensioner coupled to the tether, wherein the pretensioner is configured to, upon deployment, apply tension to the tether to maintain a desired shape of the mitt.

12. The airbag cushion assembly of claim 11, wherein the pretensioner is coupled to a lower portion of a vehicle seat, wherein the at least one tether is coupled to the mitt, and wherein the airbag cushion is configured to deploy such that the at least one tether extends in a downward direction to the pretensioner such that the at least one tether anchors the airbag cushion to the lower portion of the vehicle seat during deployment.

13. An airbag cushion, comprising:
a plurality of elongated chambers positioned adjacent to one another and extending from a lower end of the airbag cushion to an upper end of the airbag cushion;
a mitt defined at least in part by a subset of the plurality of elongated chambers, wherein the airbag cushion is configured to deploy by extending in a first direction, bending the airbag cushion to form the mitt, and extending in a second direction at an angle relative to the first direction;
at least one external tether coupled with the airbag cushion; and
a pretensioner coupled with the at least one external tether.

14. The airbag cushion of claim 13, wherein each of the plurality of elongated chambers is defined by a pair of opposing internal panels, and wherein each of the opposing internal panels extends from a first side of the airbag cushion to a second side of the airbag cushion opposite from the first side.

15. The airbag cushion of claim 14, wherein each of the elongated chambers in the subset is defined by:
a first internal panel extending between the first side of the airbag cushion and the second side of the airbag cushion opposite from the first side; and
a second internal panel extending between the first side of the airbag cushion and the second side of the airbag cushion, wherein a first distance between the first internal panel and the second internal panel at the first side is greater than a second distance between the first internal panel and the second internal panel at the second side such that, upon deployment, the positioning of the internal panels in the subset causes the airbag cushion to bend and form the mitt.

16. The airbag cushion of claim 13, wherein a first section of the plurality of elongated chambers comprises a first maximum height extending between the upper end of the airbag cushion and the lower end of the airbag cushion, wherein a second section of the plurality of elongated chambers comprises a second maximum height extending between the upper end of the airbag cushion and the lower end of the airbag cushion, and wherein the first maximum height is greater than the second maximum height.

17. The airbag cushion of claim 16, wherein the mitt coincides with the first section of the plurality of elongated chambers.

* * * * *